United States Patent
Nimura et al.

(10) Patent No.: US 7,323,537 B2
(45) Date of Patent: Jan. 29, 2008

(54) CATALYST FOR PRODUCTION OF POLYESTER, PROCESS FOR PRODUCING POLYESTER USING IT AND TITANIUM-CONTAINING POLYETHYLENE TEREPHTHALATE

(75) Inventors: Hitoshi Nimura, Yokkaichi (JP); Motohiro Munakata, Yokkaichi (JP); Toru Mori, Tokyo (JP); Toshio Akai, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/291,975

(22) Filed: Dec. 2, 2005

(65) Prior Publication Data

US 2006/0084784 A1    Apr. 20, 2006

Related U.S. Application Data

(63) Continuation of application No. PCT/JP2004/008077, filed on Jun. 3, 2004.

(30) Foreign Application Priority Data

Jun. 3, 2003 (JP) .............................. 2003-158369
Jun. 3, 2003 (JP) .............................. 2003-158370

(51) Int. Cl.
*C08G 63/02* (2006.01)

(52) U.S. Cl. ...................... 528/272; 501/150; 528/271

(58) Field of Classification Search ................ 528/275, 528/279, 281, 295, 298, 300, 302, 307, 308, 528/308.6, 271, 272; 524/765, 783, 788, 524/789; 502/150
See application file for complete search history.

(56) References Cited

U.S. PATENT DOCUMENTS

| | | | |
|---|---|---|---|
| 5,017,680 A * | 5/1991 | Sublett | 528/274 |
| 5,684,116 A | 11/1997 | Martl et al. | |
| 6,346,070 B1 * | 2/2002 | Ohmatsuzawa et al. | 528/279 |
| 6,365,659 B1 | 4/2002 | Aoyama et al. | |
| 6,500,915 B1 | 12/2002 | Fujimori et al. | |
| 6,649,731 B2 * | 11/2003 | Hori et al. | 528/279 |
| 6,998,462 B2 * | 2/2006 | Duan et al. | 528/279 |

FOREIGN PATENT DOCUMENTS

| | | |
|---|---|---|
| JP | 59-142221 | 8/1984 |
| JP | 2000-143789 * | 5/2000 |
| JP | 2000-169600 | 6/2000 |
| JP | 2001-200044 | 7/2001 |
| JP | 2001-288262 | 10/2001 |
| JP | 2002-503274 | 1/2002 |
| JP | 2002-512281 | 4/2002 |
| JP | 2002-293906 | 10/2002 |
| JP | 2004-217887 | 8/2004 |
| WO | WO 98/56848 | 12/1998 |
| WO | WO 99/54379 | 10/1999 |

\* cited by examiner

*Primary Examiner*—Terressa Boykin
(74) *Attorney, Agent, or Firm*—Oblon, Spivak, McClelland, Maier & Neustadt, P.C.

(57) ABSTRACT

To provide a catalyst for production of a polyester, a process for producing a polyester using the catalyst and a titanium-containing polyethylene terephthalate having excellent characteristics.

A catalyst for production of a polyester, characterized by comprising at least (1) a Group 4A compound (hereinafter referred to as compound (1)), (2) a compound of at least one element selected from the group consisting of magnesium, calcium and zinc (hereinafter referred to as compound (2)) and an oxygen-containing organic solvent. A process for producing a polyester using this catalyst. A titanium-containing polyethylene terephthalate, having characteristics represented by the following (A), (B) and (C):

(A) titanium K absorption edge: the peak intensity ratio R defined by R=A/B exceeds 0.2, where A is the intensity of a peak having the maximum intensity among K absorption pre-edge peaks, and B is the maximum peak intensity of K absorption post-edge peaks in a XANES spectrum obtained by normalizing a XAFS spectrum;

(B) the amount of carboxyl end groups is less than 35 eq/ton; and (C) the intrinsic viscosity is at least 0.5 dl/g.

19 Claims, No Drawings

CATALYST FOR PRODUCTION OF POLYESTER, PROCESS FOR PRODUCING POLYESTER USING IT AND TITANIUM-CONTAINING POLYETHYLENE TEREPHTHALATE

This application is a Continuation of PCT/JP04/08077 filed Jun. 3, 2004.

BACKGROUND OF THE INVENTION

1. Field of the Invention

The present invention relates to a catalyst for production of a polyester, a process for producing a polyester using such a catalyst and a titanium-containing polyethylene terephthalate having excellent characteristics.

2. Description of the Background

Heretofore, a polyester represented by a polyethylene terephthalate is excellent in mechanical strength, chemical stability, gas barrier properties, hygienic properties, etc., is available at a relatively low cost and is light in weight, and thereby has been widely used as various packaging materials as e.g. bottles and films, or as fibers, etc.

Such a polyester has been produced mainly by employing an antimony compound as a polycondensation catalyst. However, because of problems of foreign matters/haze due to deposition of antimony metal and such a problem that the antimony compound is required as a catalyst in such a large amount of from 300 to 400 ppm, a highly active catalyst has been strongly desired.

As a countermeasure, as a process for producing a polyester resin containing no antimony compound, many processes employing a Group 4B compound, particularly a titanium compound as a polycondensation catalyst have been proposed.

As a titanium compound used as a polycondensation catalyst, the following titanium compounds have been proposed for example.

It has been known to use a coprecipitate alone or as a mixture, which is produced by simultaneous hydrolytic precipitation of a titanium compound and a metal compound of a metal selected from Groups IA, IIA, VIIIA, IB, IIB, IIIB and IVB of the Periodic Table. Specifically, it has been known to use as a catalyst a coprecipitate produced by simultaneous hydrolysis of titanium tetraisopropoxide and an alkoxy compound of e.g. magnesium for example with water in dehydrated ethanol (JP-A-2002-503274).

Preparation of the above catalyst requires a plurality of steps including hydrolysis of an alkoxy compound, centrifugal separation, washing and drying. The catalyst thus prepared is once dried and then subjected to a polycondensation reaction as a slurry of a solvent such as ethylene glycol, and accordingly, the catalyst comprises coarse particles, and the catalyst may remain as a foreign matter in a polyester to be obtained in some cases.

Further, it has been known to use as a catalyst a mixture obtained by preliminarily mixing a composite oxide comprising titanium and silicon as main metal elements with a diol or its ester forming derivative, followed by heating at from 160 to 220° C. Specifically, it has been disclosed to use as a catalyst a product obtained by hydrolyzing a mixture of titanium tetraisopropoxide and ethyl orthosilicate with water in ethanol to obtain a coprecipitate, and subjecting the coprecipitate to heat treatment at 198° C. in ethylene glycol (JP-A-2001-288262).

By use of the above catalyst, the amount of foreign matters in a polyester resin tends to be small as compared with a case of using antimony as a catalyst, but according to studies by the present inventors, the above catalysts has been found to be insufficient for practical use. Further, preparation of the above catalyst also requires a plurality of steps including mixing of catalyst components, heating for formation of a gel and vacuum drying.

Further, it has been known to use as a promoter a polysiloxane for polymerization for the purpose of improving the color tone. Specifically, it has been disclosed to use an organic polyborosiloxane (JP-A-59-142221). The polysiloxane disclosed in the publication is obtained by mixing diphenyl dichlorosilane with boric acid and then reacting them for 12 hours, and preparation of the catalyst takes long.

Further, it has been known to add at the time of polymerization a titanium compound and at least one compound selected from a magnesium compound, an aluminum compound, a barium compound and the like. Specifically, it has been disclosed to add titanium tetrabutoxide and magnesium acetate at the time of polymerization (JP-A-2000-143789).

The method disclosed in the above publication has such problems that a polyester to be obtained has poor color tone, and the acetaldehyde content after solid phase polymerization is high.

Further, there is some restriction for use in some cases, for example, when a plurality of metal compounds among the above catalysts are used in combination as a catalyst, it is required to specify the timing of addition of each metal compound.

Further, a polyester produced by using a titanium compound as a polycondensation catalyst is insufficient in thermal stability as represented by an acid value or the like, as compared with a polyester resin produced by using an antimony compound in some cases.

However, according to studies by the present inventors, it has been found that a method of employing such a catalyst comprising a titanium compound is not satisfactory as an industrial production method from the following reasons. That is, since the polycondensation reaction takes long, a decomposition reaction will proceed, and the color tone of a polyester to be obtained tends to deteriorate, thermal stability as represented by an acid value or the like may be insufficient, the volume resistivity may be insufficiently high, and the acetaldehyde content in the resin and the foreign matter content in the polymer are not satisfactory.

Accordingly, an alternative catalyst which has excellent activity, with which a high quality polyester can be produced and which can easily be handled, has been strongly desired.

SUMMARY OF THE INVENTION

Under these circumstances, it is an object of the present invention to provide a catalyst for production of a polyester, which overcomes such a drawback of a conventional catalyst that the color tone deteriorates due to a long polycondensation reaction, and with which a polyester with more improved thermal stability, volume resistivity or acetaldehyde content in a polyester resin to be obtained and foreign matter content in a polymer, can be provided. Further, it is to provide a process for producing a polyester having excellent characteristics with high productivity by using such a catalyst.

Further, it is to provide a titanium-containing polyethylene terephthalate having excellent characteristics, in which titanium atoms derived from a titanium compound used as a catalyst for a polycondensation reaction have a specific structure in the obtained polyethylene terephthalate (hereinafter sometimes abbreviated as PET).

The present inventors have conducted extensive studies to achieve the above objects and as a result, found that a catalyst for production of a polyester comprising at least (1) a Group 4B compound (hereinafter sometimes abbreviated as compound (1)), (2) a compound of at least one element selected from the group consisting of magnesium, calcium and zinc (hereinafter sometimes abbreviated as compound (2)) and an oxygen-containing organic solvent, or a catalyst for production of a polyester comprising the compound (1), the compound (2), (3) a silicate compound (hereinafter sometimes abbreviated as compound (3)) and an oxygen-containing organic solvent, has high activity as a catalyst for production of a polyester, and that a polyethylene terephthalate produced by using such a catalyst is very excellent in quality, and accomplished the present invention.

DETAILED DESCRIPTION OF THE PREFERRED EMBODIMENTS

Namely, the present invention resides in a catalyst for production of a polyester comprising at least (1) a compound of Group 4B, (2) a compound of at least one element selected from the group consisting of magnesium, calcium and zinc, and an oxygen-containing organic solvent, and a process for producing a polyester by subjecting a dicarboxylic acid component containing an aromatic dicarboxylic acid and/or its ester forming derivative as the main component and a dihydric alcohol component to a polycondensation reaction via an esterification reaction and/or an ester exchange reaction, wherein the above catalyst for production of a polyester is used.

The present invention further resides in a titanium-containing polyethylene terephthalate characterized by having characteristics represented by the following (A), (B) and (C):

(A) titanium K absorption edge: the peak intensity ratio R defined by R=A/B exceeds 0.2, where A is the intensity of a peak having the maximum intensity among K absorption pre-edge peaks, and B is the maximum peak intensity of K absorption post-edge peaks in a XANES spectrum obtained by normalizing a XAFS spectrum;

(B) the amount of carboxyl end groups is less than 35 eq/ton; and (C) the intrinsic viscosity is at least 0.5 dl/g.

Now, the present invention will be explained in detail below. However, the following explanation regarding constituting elements is a typical example for the embodiment of the present invention, and the present invention is by no means restricted to the following explanation.

The catalyst for production of a polyester according to the present invention comprises at least (1) a Group 4B compound, (2) a compound of at least one element selected from the group consisting of magnesium, calcium and zinc, and an oxygen-containing organic solvent.

The above Group 4B compound (1) may be a titanium compound, a zirconium compound or a hafnium compound, and among them, a titanium compound is preferred.

As the titanium compound, specifically, an organic titanium compound such as a titanium alkoxide such as titanium tetramethoxide, titanium tetraethoxide, titanium tetraisopropoxide or titanium tetrabutoxide, or an acetylacetonate of titanium may be usually used. Among them, a titanium alkoxide is preferred. The alkoxy group has preferably from 1 to 30 carbon atoms, more preferably from 1 to 10 carbon atoms.

The compound (2) of at least one element selected from the group consisting of magnesium, calcium and zinc is preferably a compound of at least one element selected from the group consisting of magnesium and calcium, particularly preferably a magnesium compound. By use of such a compound (2), the volume resistivity of a polyester to be obtained tends to be low, and thus the compound (2) is suitably used to obtain a polyester particularly for films. The compound (2) is not limited so long as its counter ions or the like will not impair the polycondensation reaction. Specifically, a hydroxide, an acetate, a nitrate, a halide, a carbonate, a carboxylate, an alkoxide, an acetylacetonate or the like may be used. Among them, preferred is an acetate, a carboxylate or an alkoxide of the above element.

The oxygen-containing organic solvent may, for example, be a monohydric alcohol such as methanol, ethanol, isopropanol or butanol, an aliphatic dihydric alcohol such as ethylene glycol, trimethylene glycol, tetramethylene glycol, pentamethylene glycol, hexamethylene glycol, octamethylene glycol, decamethylene glycol, neopentyl glycol, 2-ethyl-2-butyl-1,3-propanediol, diethylene glycol, polyethylene glycol or polytetramethylene ether glycol, an alicyclic dihydric alcohol such as 1,2-cyclohexanediol, 1,4-cyclohexanediol, 1,1-cyclohexanedimethylol, 1,4-cyclohexanedimethylol or 2,5-norbornanedimethylol, an aromatic dihydric alcohol such as xylylene glycol, 4,4-dihydroxybiphenyl, 2,2-bis(4'-hydroxyphenyl)propane, 2,2-bis(4'-β-hydroxyethoxyphenyl)propane, bis(4-hydroxyphenyl)sulfone or bis(4-β-hydroxyethoxyphenyl)sulfonic acid, or a dihydric alcohol such as an ethylene oxide addition product or a propylene oxide addition product of 2,2-bis(4'-hydroxyphenyl)propane. Among these oxygen-containing organic compounds, dihydric alcohols are preferred, and among them, an aliphatic dihydric alcohol is preferred, ethylene glycol or tetramethylene glycol is more preferred, and ethylene glycol is particularly preferred.

The amount of Group 4B metal atoms derived from the compound (1) contained in the catalyst for production of a polyester of the present invention is usually preferably from 10 to 100,000 ppm, more preferably from 50 to 50,000 ppm, particularly preferably from 100 to 10,000 ppm, based on the oxygen-containing organic solvent.

The ratio of the compound (1) to the compound (2) is within a range of from 95:5 to 5:95, preferably from 95:5 to 10:90, more preferably from 90:10 to 10:90, as the molar ratio of Group 4B atoms derived from the compound (1) to atoms of at least one element selected from the group consisting of magnesium, calcium and zinc derived from the compound (2).

By using the catalyst for production of a polyester of the present invention, a polyester having favorable color tone will be obtained. The reason is not clearly understood in detail, but it is considered that the compounds (1) and (2) having specific structures during the polycondensation reaction control activity of the Group 4B compound as a polycondensation reaction catalyst, and suppress a decomposition reaction which will cause coloring.

The catalyst for production of a polyester of the present invention is a batch liquid catalyst containing all the compound (1), the compound (2) and the oxygen-containing organic solvent, and it may be a transparent solution or a slurry having solids deposited therein. However, the catalyst for production of a polyester of the present invention has another characteristic that the amount of foreign matters in a polyester to be obtained is small, since the amount of solids is small as compared with a case where a conventional hydrolytic coprecipitate is used as a catalyst, i.e. the amount of solids deposited is small. Further, if the compound (2) is a magnesium compound, solids are more likely to be deposited as compared with a calcium compound or a zinc compound, but as differently from a case where a conventional hydrolytic coprecipitate is used as a catalyst for production of a polyester, solids are formed in the oxygen-containing organic solvent, whereby the deposited solids are fine, and are less likely to be sedimented or solidified. The deposited solids being fine are considered as one of the reasons why the amount of foreign matters in a polyester to be obtained is small. Further, since the catalyst is a batch liquid catalyst, its handling such as transportation or storage, or addition operation in production process, tends to be easy as compared with a conventional catalyst. Further, although a liquid catalyst is usually likely to undergo deterioration of quality in some cases, the catalyst for production of a polyester of the present invention has another characteristic that it is less likely to undergo deterioration of quality and can be stored for a long term.

For preparation of the catalyst for production of a polyester of the present invention, usually, a method of mixing the compound (1), the compound (2) and the oxygen-containing organic solvent is employed. The method of mixing the compound (1), the compound (2) and the oxygen-containing organic solvent is not particularly limited, and it may be a batch method of preliminarily mixing them in a mixture tank or a continuous method of mixing them in a transportation pipe by e.g. a mixer, and the mixing is carried out usually by a batch method. The order of mixing the compound (1), the compound (2) and the oxygen-containing organic solvent is not particularly limited. Mixing is carried out, for example, by (i) a method of adding the compound (1) to the oxygen-containing organic solvent and then adding the compound (2), (ii) a method of adding the compound (2) to the oxygen-containing organic solvent and then adding the compound (1), (iii) a method of mixing the compound (1) with the compound (2) and then mixing the oxygen-organic solvent, (iv) a method of adding the compound (1) to the oxygen-containing organic solvent and then adding a mixture of the compound (2) with the oxygen-containing organic solvent, or (v) a method of adding the compound (2) to the oxygen-containing organic solvent and then adding a mixture of the compound (1) with the oxygen-containing organic solvent. Among them, the method (i), (ii), (iii) or (iv) is preferably employed.

The catalyst for production of a polyester of the present invention preferably further contains (3) a silicate compound.

As the silicate compound (3), a compound represented by the formula $R^2_n Si(OR^1)_{4-n}$ (wherein $R^1$ and $R^2$ which are independent of each other, represents a substituent; the substituent may, for example, be an alkyl group or an aryl group; and n is an integer of from 0 to 3) is used. Specifically, a compound such as tetramethoxysilane, tetraethoxysilane, tetrabutoxysilane, tetraisopropoxysilane, tetrabutoxysilane, tetraphenoxysilane, tetrabenzyloxysilane, diphenyldimethoxysilane or diphenyldiethoxysilane may be mentioned. Among them, an orthosilicate compound wherein n in 0 is preferred, and preferred is a compound wherein $R^1$ and $R^2$ have from 1 to 30 carbon atoms, more preferably from 1 to 10 carbon atoms.

The ratio of the compound (3) to the compound (1) is usually from 95:5 to 5:95, preferably from 90:10 to 5:95, more preferably from 90:10 to 30:70, as the molar ratio of silicon atoms derived from the compound (3) to Group 4A atoms derived from the compound (1). If the amount of the compound (3) used is too large, the catalytic activity may lower in some cases, and if it is too small, improvement effects by the compound (3) as described hereinafter tend to be insufficient.

The detail of the reason why the catalyst for production of a polyester of the present invention is more effective when it contains the silicate compound (3) is unclear, but is considered as follows. When it is used for a polycondensation reaction as a batch catalyst containing all the Group 4B compound (1), the compound (2) of at least one element selected from the group consisting of magnesium, calcium and zinc, the silicate compound (3) and the oxygen-containing organic solvent, dispersibility and the like of effective components in the catalyst for production of a polyester of the present invention in the polycondensation reaction system is improved by the compound (3), whereby the catalytic performance further improves.

In a case where the catalyst for production of a polyester of the present invention contains the compound (3) as a preferred embodiment also, for preparation of the catalyst, usually a method of mixing the compounds (1), (2) and (3) and the oxygen-containing organic solvent is employed. The method of mixing the compounds (1), (2) and (3) and the oxygen-containing organic solvent is not particularly limited, and it may be a batch method of preliminarily mixing them in a mixing tank or a continuous method of mixing them in a transportation pipe using e.g. a mixer, and the mixing is carried out usually by a batch method. The method of mixing the compounds (1), (2) and (3) and the oxygen-containing organic solvent is not particularly limited. It may, for example, be (v) a method of adding the compound (1) to the oxygen-containing organic solvent and then adding the compound (2) and then adding the compound (3), (vi) a method of adding the compound (1) to the oxygen-containing organic solvent and then adding the compound (3) and then adding the compound (2), (vii) a method of adding the compound (3) to the oxygen-containing organic solvent and then adding the compound (2) and then adding the compound (1), (viii) a method of adding the compound (3) to the oxygen-containing organic solvent and then adding the compound (1) and then adding the compound (2), (ix) a method of adding the compound (2) to the oxygen-containing organic solvent and then adding the compound (3) and adding the compound (1), (x) a method of adding the compound (2) to the oxygen-containing organic solvent and then adding the compound (1) and then adding the compound (3), (xi) a method of adding the compound (3) to the oxygen-containing organic solvent and then adding a mixture of the compound (2) with the oxygen-containing organic solvent, and then adding a mixture of the compound (1) with the oxygen-containing organic solvent, (xii) a method of simultaneously adding the compounds (1), (3) and (2) to the oxygen-containing organic solvent, or (xiii) a method of adding a mixture of the compound (1) with the compound (3) to the oxygen-containing organic solvent and then adding the compound (2). The mixing may be carried out by any method, but the method (vii), (ix) or (xi) is preferably employed.

The temperature at the time of preparation of the catalyst for production of a polyester of the present invention is not particularly limited, but preparation is carried out preferably at a temperature of at most 150° C., more preferably at most 100° C. As the preparation temperature increases, hydrolysis is more likely to occur during the mixing, and the effects of the catalyst for production of a polyester of the present invention tend to decrease.

Although the lower limit of the preparation temperature is not particularly limited, preparation is carried out usually at a temperature of at least 0° C., preferably at least 10° C., since as the preparation temperature decreases, the viscosity of the oxygen-containing organic solvent tends to increase, and solubility and dispersibility of the compound (1) and/or the compound (2) may be insufficient in some cases.

In a case where the catalyst for production of a polyester of the present invention is a slurry wherein a magnesium compound is used as the compound (2) and solids are dispersed, the solids are preferably hexagonal crystals. The hexagonal crystals have such a structure that one atom of a Group 4B element derived from the compound (1) and/or magnesium element derived from the compound (2) are solvated by six molecules of ethylene glycol. It is considered that when the catalyst for production of a polyester of the present invention has such hexagonal crystals, the crystals having a specific structure during the polycondensation reaction control the activity of the Group 4B compound as a polycondensation reaction catalyst and suppress a decomposition reaction which may cause coloring, whereby more favorable characteristics will be obtained.

The catalyst for production of a polyester of the present invention may contain a compound containing another metal element, such as an antimony compound, a germanium compound, a cobalt compound or a tin compound, within a range not to impair the performance. However, effective components as the catalyst for production of a polyester are considered to be the compounds (1) and (2) and the oxygen-containing organic solvent, and accordingly, the catalyst for production of a polyester is preferably one comprising the compounds (1) and (2) and the oxygen-containing organic solvent alone, and in a case where one further containing the compound (3) is used also, it is preferred to use the one as it is.

The process for producing a polyester of the present invention is a process for producing a polyester by subjecting a dicarboxylic acid component containing an aromatic dicarboxylic acid and/or its ester forming derivative as the main component and a dihydric alcohol component to polycondensation via an esterification reaction and/or an ester exchange reaction, wherein the above catalyst for production of a polyester is used for the polymerization reaction system, and the catalyst for production of a polyester is used preferably as a polycondensation catalyst.

In the present invention, specifically, the aromatic dicarboxylic acid and/or its ester forming derivative may, for example, be an aromatic dicarboxylic acid such as terephthalic acid, phthalic acid, isophthalic acid, dibromoisophthalic acid, sodium sulfoisophthalate, phenylenedioxy dicarboxylic acid, 4,4'-diphenyl dicarboxylic acid, 4,4'-diphenyl ether dicarboxylic acid, 4,4'-diphenyl keton dicarboxylic acid, 4.4'-diphenoxyethane dicarboxylic acid, 4,4'-diphenylsulfone dicarboxylic acid or 2,6-naphthalene dicarboxylic acid, or a dialkyl ester having from about 1 to about 4 carbon atoms of such an aromatic dicarboxylic acid, such as dimethyl terephthalate or dimethyl 2,6-naphthalene dicarboxylate, or a halide thereof, and two or more of them may be contained. Among them, terephthalic acid, isophthalic acid, 2,6-naphthalene dicarboxylic acid or an ester forming derivative thereof is preferred, and terephthalic acid or its ester forming derivative is particularly preferred.

Here, "main component" means that the amount of the aromatic dicarboxylic acid and/or its ester forming derivative is at least 80 mol % of the dicarboxylic acid component, and it is preferably at least 90 mol %, more preferably at least 95 mol %, particularly preferably at least 98 mol %.

As a dicarboxylic acid component other than the above aromatic dicarboxylic acid and/or its ester forming derivative, an alicyclic dicarboxylic acid such as hexahydroterephthalic acid or hexahydroisophthalic acid, an aliphatic dicarboxylic acid such as succinic acid, glutaric acid, adipic acid, pimelic acid, suberic acid, azelaic acid, sebacic acid, undecadicarboxylic acid or dodecadicarboxylic acid, or a dialkyl ester having from about 1 to about 4 carbon atoms or a haloid of such an alicylic dicarboxylic acid or an aliphatic dicarboxylic acid may, for example, be mentioned.

The dihydric alcohol may, for example, be an aliphatic dihydric alcohol such as ethylene glycol, trimethylene glycol, tetramethylene glycol, pentamethylene glycol, hexamethylene glycol, octamethylene glycol, decamethylene glycol, neopentyl glycol, 2-ethyl-2-butyl-1,3-propanediol, diethylene glycol, polyethylene glycol or polytetramethylene ether glycol, an alicyclic dihydric alcohol such as 1,2-cyclohexanediol, 1,4-cyclohexanediol, 1,1-cyclohexanedimethylol, 1,4-cyclohexanedimethylol or 2,5-norbornanedimethylol, an aromatic dihydric alcohol such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone or bis(4-β-hydroxyethoxyphenyl)sulfonic acid, or an ethylene oxide addition product or a propylene oxide addition product of 2,2-bis(4'-hydroxyphenyl)propane. Two or more of them may be contained. Among them, ethylene glycol or tetramethylene glycol is preferred, and ethylene glycol is particularly preferred.

Further, one or more of hydroxycarboxylic acids and alkoxycarboxylic acids, such as glycolic acid, p-hydroxybenzoic acid and p-β-hydroxyethoxybenzoic acid, monofunctional components such as stearyl alcohol, benzyl alcohol, stearic acid, benzoic acid, t-butylbenzoic acid and benzoylbenzoic acid, and trifunctional and higher polyfunctional components such as tricarballylic acid, trimellitic acid, trimesic acid, pyromellitic acid, gallic acid, trimethylol ethane, trimethylol propane, glycerol and pentaerythritol, may, for example, be used as a copolymerizable component.

In the reaction of the aromatic dicarboxylic acid and/or its ester forming derivative with the dihydric alcohol, the ratio of the latter to the former is usually from 1 to 3 molar times.

The process for producing a polyester of the present invention is not particularly limited except for the use of the catalyst for production of a polyester, and a conventional process for producing a polyester comprising esterification, melt polycondensation and subsequent solid-phase polycondensation as the case requires can be employed. A typical production example will be shown below. A dicarboxylic acid component and a dihydric alcohol component are subjected to an esterification reaction in an esterification reaction tank in the presence of an esterification catalyst as the case requires at a temperature of usually from 240 to 280° C., preferably from 250 to 270° C., under an absolute pressure of usually from 0.1 to 0.4 MPa, preferably from 0.1 to 0.3 MPa, for from 1 to 10 hours with stirring. The obtained polyester low molecular weight product as an esterification reaction product is transferred to a polycondensation reaction tank and subjected to melt polycondensation in the presence of a polycondensation catalyst at a temperature of usually from 260 to 290° C., preferably from 265 to 285° C. for from 1 to 20 hours with stirring under such a pressure that the pressure is gradually reduced from the atmospheric pressure so that finally the absolute pressure will be usually from $1.3 \times 10^1$ to $1.3 \times 10^3$ Pa, preferably from $6.7 \times 10^1$ to $6.7 \times 10^2$ Pa. These operations may be carried out either by a continuous method or a batch method.

The resin obtained by the melt polycondensation is usually withdrawn in the form of a strand from a discharge outlet provided at the bottom of the polycondensation reaction tank, and while being cooled by water or after being cooled by water, it is cut by a cutter into particles such as pellets or chips. Further, such particles after the melt polycondensation may be subjected to solid-phase polycondensation as the case requires. The solid-phase polycondensation is carried out, for example, by heating such particles in an atmosphere of an inert gas such as nitrogen, carbon dioxide or argon, in a steam atmosphere or in a steam-containing inert gas atmosphere at a temperature of usually from 60 to 180° C., preferably from 150 to 170° C. to crystallize the surface of the resin particles, and then subjecting the particles to a heat treatment in an inert gas atmosphere and/or under reduced pressure at a level of from $1.3 \times 10^1$ to $1.3 \times 10^3$ Pa by the absolute pressure, usually at a temperature from a temperature immediately below the sticking temperature of the resin to a temperature lower than it by 80° C., preferably at a temperature lower than the sticking temperature by from 10 to 60° C., for usually at most 50 hours while making the particles flow so that they will not aggregate. By this solid-phase polycondensation, a higher degree of polymerization will be achieved and in addition, the amounts of acetaldehyde, low molecular weight oligomers and the like as reaction by-products can be reduced. Further, the resin obtained by the above melt polycondensation or solid-phase polycondensation may further be treated depending upon a purpose of inactivating the polycondensation catalyst. For example, water treatment of dipping it in water of at least 40° C. for at least 10 minutes, or steam treatment of contacting it with steam or a steam-containing gas of at least 60° C. for at least 30 minutes, may be carried out.

The timing of addition of the catalyst for production of a polyester of the present invention is not particularly limited, and the catalyst may be added at any one of optional stages of a step of preparing a slurry of the dicarboxylic acid component and the dihydric alcohol component and the like as materials, and an esterification step, and the initial stage of the melt polycondensation step. The catalyst is added preferably during a period after completion of the esterification reaction until the initial stage of the melt polycondensation step, more preferably before initiation of the melt polycondensation.

The method of adding the catalyst for production of a polyester of the present invention is not particularly limited. For example, a required amount may be added all at once, or may be added dividedly in plural times as the case requires.

The catalyst for production of a polyester of the present invention is added preferably in an amount of usually from 0.1 to 200 ppm, preferably from 0.5 to 100 ppm as metal atoms derived from the compound (1) relative to the theoretical yield of the polyester resin.

Further, in the present invention, an assistant or a stabilizer to prevent deterioration of the polyester may be used. The assistant or the stabilizer may, for example, be a phosphorus compound such as a phosphate such as trimethyl phosphate, triethyl phosphate, tri-n-butyl phosphate, trioctyl phosphate, triphenyl phosphate or tricresyl phosphate, an acidic phosphate such as methyl acid phosphate, ethyl acid phosphate, isopropyl acid phosphate, butyl acid phosphate, dibutyl phosphate, monobutyl phosphate or dioctyl phosphate, or phosphoric acid, phosphorous acid or polyphosphoric acid.

The assistant or the stabilizer is added preferably at the time of preparation of the material slurry, at an optional stage in the esterification step or at the initial stage of the melt polycondensation step. The assistant or the stabilizer is used in an amount of usually from 1 to 1,000 ppm as the weight of the phosphorus atoms usually based on the total polycondensation materials.

The polyethylene terephthalate (hereinafter sometimes abbreviated as PET) of the present invention has the following characteristics as first characteristics. Namely, the peak intensity ratio R as defined by R=A/B exceeds 0.2, where A is the intensity of a peak having the maximum intensity among K absorption pre-edge peaks (peaks at a lower energy side than K absorption edge), and B is the maximum peak intensity of K absorption post-edge peaks (peaks at a higher energy side than the K absorption edge), in an X-ray absorption near edge structure (hereinafter sometimes abbreviated as XANES) obtained by normalizing titanium K absorption edge X-ray absorption fine structure (titanium K absorption edge XAFS) spectrum. Here, normalization means correction of the intensity in accordance with a conventional method in a spectrum from which the background of XANES is subtracted. As the K absorption edge, a known K absorption near edge region of the normalized spectrum was differentiated, and a portion with the maximum differential coefficient was taken as the K absorption edge. The absolute value of the energy was obtained by calibration defining the peak top energy of a peak having the maximum peak among K absorption pre-edge peaks in the XANES spectrum of titanium metal as 4,964.0 eV.

In the XANES spectrum, the K absorption pre-edge peak providing the intensity A is attributable to transition of the 1s orbital to the 3d orbital of titanium, which is dipole-forbidden and thus its peak intensity is usually weak. On the other hand, if the coordinate geometry around titanium is distorted from the six-fold coordinated octahedral structure, the proportion of hybrid of the 4p orbital to the 3d orbital increases as the geometry is more distorted. Accordingly, the transition of the 1s orbital to the 4p orbital is dipole-allowed, and thus the intensity A increases. That is, the intensity A increases as the coordinate geometry around titanium is more distorted from the six-fold coordinated octahedral structure. The PET of the present invention is characterized in that R exceeds 0.2, preferably exceeds 0.25, more preferably exceeds 0.3, where R is the above intensity ratio defined by R=A/B.

The above-described titanium in a specific state is considered to be derived from the catalyst used for the polycondensation reaction. That is, it is considered that activity of the titanium-containing catalyst for the polycondensation reaction in the polycondensation step improves, and the decomposition reaction is suppressed and formation of carboxyl end groups as a by-product is prevented, and accordingly the PET of the present invention having titanium in such a state has improved thermal stability and is excellent in hydrolytic resistance and color tone.

Namely, the PET of the present invention has second characteristics that it has a small amount of carboxyl end groups since the decomposition reaction is suppressed, and the amount of carboxyl end groups is less than 35 eq/ton. The amount of carboxyl end groups is more preferably less than 30 eq/ton. As described above, the PET having a large amount i.e. 35 eq/ton or more of carboxyl end groups, tends to be poor in hydrolytic resistance and color tone. The intrinsic viscosity (hereinafter sometimes abbreviated as IV) of the PET of the present invention is at least 0.5 dl/g in view of mechanical strength, and it is preferably within a range of at least 0.6 dl/g and at most 0.8 dl/g considering moldability also.

The PET having such characteristics can be preferably produced by using the catalyst for production of a polyester of the present invention.

EXAMPLES

Now, the present invention will be explained in detail with reference to Examples. However, the present invention is by no means restricted to the following Examples. Physical property values employed in Examples and Comparative Examples were measured as follows.

Intrinsic Viscosity ([η])

0.50 g of a resin sample was dissolved at a concentration (c) of 1.0 g/dl in a mixed solvent of phenol/1,1,2,2-tetrachloroethane (weight ratio:1/1) at 110° C. over a period of 20 minutes. Then, by means of an Ubbellohde capillary viscometer, the relative viscosity (ηrel) to the solvent was measured at 30° C., and the ratio (ηsp/c) of the specific viscosity (ηsp) obtained from this relative viscosity (ηrel)−1, to the concentration (c) was obtained. In a similar matter, the corresponding ratios (ηsp/c) were obtained when the concentration (c) was 0.5 g/dl, 0.2 g/dl and 0.1 g/dl, respectively. From these values, the ratio (ηsp/c) when the concentration (c) was extrapolated to be 0, was obtained as the intrinsic viscosity [η] (dl/g).

Acid Value (Carboxyl End Groups)

0.05 g of a resin sample was accurately weighed and put in a test tube, 25 ml of benzyl alcohol was added thereto, and the resin sample was heated with stirring and dissolved at 195° C. over a period of 9 minutes. Then, 2 ml of ethanol was added, followed by cooling. This solution was titrated with a 0.1N NaOH benzyl alcohol solution. Further, the above operation was carried out without using the polyester sample as a blank, and the acid value was calculated from the following formula. The acid value is an index of thermal stability of a resin, and a high acid value indicates a poor thermal stability.

Acid value (eq/ton)=$(A-B) \times 0.1 \times f/W$

Abbreviations are as follows.
A: amount (1 μl) of 0.1N NaOH required for titration
B: blank titer (μl)
W: amount (g) of polyester sample
F: factor of 0.1N NaOH benzyl alcohol Color Tone A resin sample was filled into a cylindrical powder colorimetric cell having an inner diameter of 36 mm and a depth of 15 mm to be flush, and by means of a colorimetric color difference meter ("ZE-2000", manufactured by NIPPON DENSHOKU. INDUSTRIES CO., LTD.), the color coordinate value b of the Hunter's color difference formula in the Lab color system as disclosed in Japanese Industrial Standard, 1970 (Reference 1 of JIS Z8730) was obtained as a simple average value of values measured at four positions by rotating the cell every 90° by a reflection method.

Volume Resistivity 15 g of a resin sample was put in a side-arm test tube having an inner diameter of 20 mm and a length of 180 mm, and the interior in the tube was sufficiently replaced with nitrogen. The test tube was immersed in an oil bath of 160° C., the test tube was evacuated to at most 1 Torr by a vacuum pump for vacuum drying for 4 hours, and the temperature of the oil bath was increased to 285° C. to melt the resin sample, and then pressure recovery by nitrogen and pressure reduction were repeated to remove bubbles. Into the resulting melt, two stainless steel electrodes with an area of 1 cm$^2$ were inserted in parallel with each other with a distance of 5 mm (rear sides which would not face each other were covered with an insulant), and after the temperature was stabilized, 100 V of direct current voltage was applied by means of a resistance meter ("MODEL HP4329A" manufactured by Hewlett-Packard Development Company, L.P.), and the resistivity at the time of application was taken as the volume resistivity (Ω·cm).

Acetaldehyde (AA)

5.0 g of polyester resin pellets were accurately weighed and sealed in a microbomb having an internal volume of 50 ml together with 10 ml of pure water with nitrogen sealing, and heat extraction was carried out at 160° C. for 2 hours, and the amount of acetaldehyde in the extract was determined by means of gas chromatography ("GC-14A" manufactured by Shimadzu Corporation) employing isobutyl alcohol as an internal standard.

Amount of Foreign Matters with a Particle Size of at Least 10 μM in Polymer

The number of particles having a particle size of at least 10 μm was measured as follows. 100 mg of a polyester was accurately weighed and dissolved in 10 ml of a mixed solvent comprising phenol/1,1,2,2-tetrachloroethane (weight ratio 2/3) at 100° C. over a period of 2 hours. With respect to the number and the diameter of particles in the solution, the number of particles having a particle size of at least 10 μm was measured by means of a fine particle measuring apparatus model HIAC PC-320 manufactured by Pacific Scientific Company. This operation was repeated three times to obtain an average, and the obtained number of particles was divided by the weight of the polyester measured and calculated as the number of particles per gram of the polyester to obtain the amount of foreign matters.

X-Ray Crystal Structure Analysis of Solids

The obtained solids were subjected to centrifugal separation and washed with ethanol, and the resulting solids were observed by a microscope to collect single crystals, which were subjected to X-ray structural analysis.

As a measurement apparatus, Bruker Smart 1000 was employed, and measurement was carried out under measurement conditions of X-ray output (MoKα) 50 kV, 40 mA, collimeter diameter: 0.5 phi, exposure time: 30 seconds, number of photographs: 1,321.

XAFS Measurement

XAFS spectrum measurement for XANES was carried out by means of a beamline BL9A for XAFS measurement in Photon Factory, Department of Material Structure Science, High Energy Accelerator Research Organization. X-rays were split by means of a Si(111) monochromator, and the incident X-ray intensity IO was detected by means of an ion chamber with a light path portion of 17 cm in which a He/N$_2$=70/30 mixed gas was sealed, and the fluorescent X-ray If was detected by means of an ion chamber (Lytle detector) for fluorescent XAFS measurement employing an Ar gas. The XANES spectrum μ was obtained by dividing the fluorescent X-ray intensity by the incident X-ray intensity (μ=If/IO).

Analysis Method

The XANES spectrum was obtained in such a manner that the background was subtracted by a polynomial regression at an appropriate position in the K absorption pre-edge region (in the vicinity of from 4,950 to 4,975 eV), and normalization was carried out by division by the intensity of an appropriate normalization point (one appropriate point between 5,000 and 5,050 eV) in the K absorption post-edge region or by division by a polynomial regression at an appropriate region (a higher energy side than 5,010 eV) in the K absorption post-edge region. In the K absorption pre-edge background region, the intensity is at most 0.01, and the spectrum is as flat and linear as possible. Further, in order that the maximum peak after normalization is present (in a region within 50 eV in the K absorption post-edge region in the vicinity of from 4,980 to 5,030 eV) and its intensity exceeds 1.0 and is within 1.5, the normalization is not carried out at the maximum peak intensity of a peak in the vicinity of the K absorption edge but a normalization point or a fitted polynomial was selected so that the maximum peak intensity of a peak in the vicinity of the K absorption post-edge region after normalization would be within 1.5.

In the present analysis, a known K absorption near edge region of the spectrum obtained by subtracting the background of the titanium K absorption edge XAFS spectrum and normalizing it was differentiated, and a point with the maximum differential coefficient was taken as the absorption edge. Further, the absolute value of the energy was calibrated by defining the peak top energy of a peak having the maximum intensity among K absorption pre-edge peaks in the titanium metal XANES spectrum as 4,964.0 eV.

The peak intensity ratio R defined by R=A/B was obtained, where A is the intensity of a peak having the maximum intensity among K absorption pre-edge peaks i.e. peaks present at a low energy side, and B is the peak intensity of a peak having the maximum intensity among absorption post-edge peaks i.e. peaks present at a high energy side.

EXAMPLE 1

Ti/Mg/Ethylene Glycol System

Preparation of Catalyst 200 ml of ethylene glycol was weighed in a 500 ml flask, and 1.6 g of magnesium acetate tetrahydrate was added to the flask and stirred so that magnesium acetate tetrahydrate was dissolved in ethylene glycol. Then, 0.7 g of titanium tetrabutoxide was dropped with stirring (Ti/Mg=1/4 molar ratio). After completion of the dropping, stirring was carried out at room temperature for one hour. The scheme of the preparation and the results of X-ray crystal structure analysis are shown in Table 1.

Melt Polycondensation 156 g of an ethylene terephthalate low polymer prepared by a direct esterification method employing terephthalic acid and ethylene glycol as raw materials was melted at 260° C. Then, the above-prepared catalyst solution was added in an amount of 5 ppm as titanium atoms relative to the theoretical yield of a polyester to be obtained.

Then, while the melt was stirred by an agitation blade, the temperature was increased stepwise to 280° C. over a period of 80 minutes and at the same time, the pressure in the reaction system was reduced stepwise from atmospheric pressure to an absolute pressure of $1.3 \times 10^2$ Pa over a period of 60 minutes, and after a temperature of 280° C. and an absolute pressure of $1.3 \times 10^2$ Pa were achieved, the temperature and the pressure were kept constant.

141 minutes after initiation of the pressure reduction, stirring was stopped, and a nitrogen gas was introduced into the system to terminate the polycondensation reaction. Then, the resulting polymer was withdrawn from a reaction vessel and cooled with water to obtain a polymer in the form of a strand. The polymer was cut into pellets, and evaluation was carried out.

The time from initiation of the pressure reduction to termination of the polycondensation reaction (polycondensation reaction time), the intrinsic viscosity, the color coordinate b as the color tone and the volume resistivity of the obtained polymer are shown in Table 2.

Solid-Phase Polycondensation

Subsequently, the above-obtained polyester resin chips were dried in an inert oven (DN410I manufactured by YAMATO SCIENTIFIC CO., LTD.) in a stream of nitrogen at 30 N liter/min at 160° C. for 2 hours, and then heated at 210° C. for 10 hours for solid-phase polycondensation.

Then, the obtained resin was put in a reactor and dried under a reduced pressure of an absolute pressure of $6.0 \times 10$ Pa at 160° C. for 2 hours and 30 minutes and heated at 290° C. for 15 minutes and remelted. The remelted polymer was withdrawn from the reactor in the form of a strand, cooled with water and cut by a cutter into pellets. With respect to the obtained polyester resin pellets, the intrinsic viscosity and the acetaldehyde content of the polymer were measured, and the results are shown in Table 2. This Example is an example wherein the compounds (1) and (2) were used, and no compound (3) is used. Although the acetaldehyde content after the solid-phase polycondensation was high, favorable results were obtained with respect to the other physical properties.

EXAMPLE 2

Ti/Mg/Si/Ethylene Glycol System

Preparation of Catalyst 200 ml of ethylene glycol was weighed in a 500 ml flask, 2.2 g of tetraethoxysilane was dropped into the flask with stirring, and after completion of the dropping, stirring was carried out at room temperature for 30 minutes. Then, 0.4 g of magnesium acetate tetrahydrate was added, followed by stirring at room temperature further for 30 minutes. After completion of the stirring, 0.7 g of titanium tetrabutoxide was dropped with stirring (Ti/Si/Mg=1/5/1: molar ratio). After completion of the dropping, stirring was carried out at room temperature for 1 hour.

The scheme of the preparation and the results of X-ray crystal structure analysis are shown in Table 1.

Melt Polycondensation

The polycondensation reaction and evaluation were carried out in the same manner as in Example 1 except that the above-prepared catalyst was used, and the polycondensation reaction time was 135 minutes.

The time from the initiation of the pressure reduction to the termination of the polycondensation reaction (polycondensation reaction time), and the intrinsic viscosity, the color coordinate b as the color tone and the volume resistivity of the obtained polymer are shown in Table 2.

Solid-Phase Polycondensation

The polycondensation reaction and evaluation were carried out in the same manner as in Example 1. The results are shown in Table 2.

This Example is an example wherein the compounds (1), (2) and (3) were used. Favorable results were obtained with respect to all the physical properties.

EXAMPLE 3

Ti/Si/Mg/Ethylene Glycol System

Preparation of Catalyst

A catalyst was prepared in the same manner as in Example 2 except that 1.3 g of magnesium acetate tetrahydrate was used (Ti/Si/Mg=1/5/3: molar ratio). The scheme is shown in Table 1.

Melt Polycondensation

The polycondensation reaction and evaluation were carried out in the same manner as in Example 1 except that the above-prepared catalyst was used, and the polycondensation reaction time was 131 minutes.

The results are shown in Table 2.

Solid-Phase Polycondensation

The polycondensation reaction and evaluation were carried out in the same manner as in Example 1. The results are shown in Table 2.

This Example is an example wherein the amount of compound (2) was increased as compared with Example 2, and favorable results were obtained with respect to all the physical properties.

EXAMPLE 4

Ti/Si/Mg/Ethylene Glycol System

Preparation of Catalyst

A catalyst was prepared in the same manner as in Example 3 except that the order of addition of magnesium acetate tetrahydrate and titanium tetrabutoxide was reversed (Ti/Si/Mg=1/5/3: molar ratio).

Melt Polycondensation

The polycondensation reaction and evaluation were carried out in the same manner as in Example 1 except that the above-prepared catalyst was used, and the polycondensation reaction time was 136 minutes. The results are shown in Table 2.

Solid-Phase Polycondensation

The polycondensation reaction and evaluation were carried out in the same manner as in Example 1. The results are shown in Table 2.

This Example is an example wherein the compounds (1) to (3) were mixed in an order different from that of Example 3, and favorable results were obtained with respect to all the physical properties.

EXAMPLE 5

Ti/Mg/Si/Ethylene Glycol System

Preparation of Catalyst 200 ml of ethylene glycol was weighed in a 500 ml flask, 1.6 g of magnesium acetate tetrahydrate was added into the flask with stirring, and stirring was carried out at room temperature for 30 minutes after the addition. Then, 0.4 g of tetraethoxysilane was dropped, and after completion of the dropping, stirring was carried out at room temperature further for 30 minutes. After completion of the stirring, 0.7 g of titanium tetrabutoxide was dropped with stirring (Ti/Si/Mg=1/1/4: molar ratio). After completion of the dropping, stirring was carried out at 70° C. for 1 hour. The scheme of the preparation and the results of X-ray crystal structure analysis are shown in Table 1.

Melt Polycondensation

The polycondensation reaction and evaluation were carried out in the same manner as in Example 1 except that the above-prepared catalyst was added in an amount of 6 ppm as titanium atoms relative to the theoretical yield of a polyester to be obtained, and the polycondensation reaction time was 157 minutes. The results are shown in Table 2.

Solid-Phase Polycondensation

The polycondensation reaction and evaluation were carried out in the same manner as in Example 1. The is results are shown in Table 2.

In this Example, the amounts and the order of addition of the compounds (2) and (3) were changed. Although the color coordinate value b was somewhat poor, favorable results were obtained with respect to the other physical properties.

EXAMPLE 6

Ti/Si/Zn/Ethylene Glycol System

Preparation of Catalyst

A catalyst was prepared in the same manner as in Example 5 except that magnesium acetate tetrahydrate was changed to 0.6 g of zinc methoxyethoxide (Ti/Si/Zn=1/1/2: molar ratio). The scheme of the preparation of the catalyst is shown in Table 1.

Melt Polycondensation

The polycondensation reaction and evaluation were carried out in the same manner as in Example 1 except that the above-prepared catalyst was added in an amount of 5 ppm as titanium atoms relative to the theoretical yield of a polyester to be obtained, and the polycondensation reaction time was 134 minutes. The results are shown in Table 2.

Solid-Phase Polycondensation

The polycondensation reaction and evaluation were carried out in the same manner as in Example 1. The results are shown in Table 2.

This Example is an example wherein a zinc compound was used instead of a magnesium compound as the compound (2). Although the volume resistivity and the acetaldehyde content were somewhat high, favorable results were obtained with respect to the other physical properties.

EXAMPLE 7

Ti/Si/Ca/Ethylene Glycol System

Preparation of Catalyst

A catalyst was prepared in the same manner as in Example 5 except that magnesium acetate tetrahydrate was changed to 1.1 g of calcium acetate monohydrate (Ti/Si/Ca=1/1/2: molar ratio). The scheme of the preparation of the catalyst is shown in Table 1.

Melt Polycondensation

The polycondensation reaction and evaluation were carried out in the same manner as in Example 1 except that the above-prepared catalyst was added in an amount of 5 ppm as titanium atoms relative to the theoretical yield of a polyester to be obtained, and the polycondensation reaction time was 136 minutes. The results are shown in Table 2.

Solid-Phase Polycondensation

The polycondensation reaction and evaluation were carried out in the same manner as in Example 1. The results are shown in Table 2.

This Example is an example wherein a calcium compound is used instead of a magnesium compound as the compound (2).

Although the acetaldehyde content was somewhat high, favorable results were obtained with respect to the other physical properties.

Comparative Example 1

Ti/Si/Ethylene Glycol System

Preparation of Catalyst 200 ml of ethylene glycol was weighed in a 500 ml flask, 2.2 g of tetraethoxysilane was dropped into the flask with stirring, and after completion of the dropping, stirring was carried out at room temperature for 30 minutes. 0.7 g of titanium tetrabutoxide was dropped with stirring (Ti/Si=1/5: molar ratio). After completion of the dropping, stirring was carried out at room temperature for 1 hour to obtain a colorless and transparent catalyst solution.

The scheme of the preparation of the catalyst is shown in Table 1.

Melt Polycondensation

The polycondensation reaction and evaluation were carried out in the same manner as in Example 1 except that the above-prepared catalyst was used, and the polycondensation reaction time was 111 minutes. The results are shown in Table 2.

Solid-Phase Polycondensation

The polycondensation reaction and evaluation were carried out in the same manner as in Example 1. The results are shown in Table 2.

This Example is an example wherein no compound (2) was used as compared with Example 2. The volume resistivity and the color coordinate b showed high values.

Comparative Example 2

Ti/Si/Ethylene Glycol System

Preparation of Catalyst

A catalyst was prepared in the same manner as in Comparative Example 1 except that 0.4 g of tetraethoxysilane was used (Ti/Si=1/1: molar ratio) and the order of addition of tetraethoxysilane and titanium tetrabutoxide was reversed.

The scheme of the preparation of the catalyst is shown in Table 1.

Melt Polycondensation

The polycondensation reaction and evaluation were carried out in the same manner as in Example 1 except that the above-prepared catalyst was used, and the polycondensation reaction time was 117 minutes. The results are shown in Table 2.

Solid-Phase Polycondensation

The polycondensation reaction and evaluation were carried out in the same manner as in Example 1. The results are shown in Table 2.

Comparative Example 3

Ti/Si/Ethylene Glycol System

Preparation of Catalyst

A catalyst was prepared in the same manner as in Comparative Example 2 except that the order of addition of tetraethoxysilane and titanium tetrabutoxide was reversed. The scheme of the preparation of the catalyst is shown in Table 1.

Melt Polycondensation

The polycondensation reaction and evaluation were carried out in the same manner as in Example 1 except that the above-prepared catalyst was used, and the polycondensation reaction time was 112 minutes. The results are shown in Table 2.

Solid-Phase Polycondensation

The polycondensation reaction and evaluation were carried out in the same manner as in Example 1. The results are shown in Table 2.

Comparative Examples 2 and 3 are examples wherein the ratio of the compound (1) to the compound (3) was the same as in Examples 5 to 7, but no compound (2) was used. In either Example, the volume resistivity showed a high value.

Comparative Example 4

Ti/Si/Ethylene Glycol System+Mg+P

Preparation of Catalyst

A catalyst was prepared in the same manner as in Comparative Example 1. The scheme of the preparation is shown in Table 1.

Preparation of Other Solutions

A magnesium acetate solution was prepared by the following method. 200 ml of ethylene glycol was weighed in a 500 ml flask, and 2.2 g of magnesium acetate tetrahydrate was introduced into the flask with stirring. After completion of the introduction, stirring was carried out at room temperature for 30 minutes to obtain a colorless and transparent solution.

An orthophosphoric acid solution was prepared by the following method. 50 ml of ethylene glycol was weighed in a 100 ml flask, and 0.8 g of orthophosphoric acid was dropped in the flask with stirring. After completion of the dropping, stirring was carried out at room temperature for 1 hour to obtain a colorless and transparent solution.

Melt Polycondensation

The polycondensation reaction and evaluation were carried out in the same manner as in Example 1 except that the magnesium acetate solution in an amount of 7 ppm as magnesium atoms relative to the theoretical yield of a polyester to be obtained and the orthophosphoric acid solution in an amount of 3 ppm as phosphorus atoms relative to the theoretical yield of a polyester to be obtained were added in the reactor, and then the catalyst solution was introduced, and the polycondensation reaction time was 125 minutes. The results are shown in Table 2.

Solid-Phase Polycondensation

The polycondensation reaction and evaluation were carried out in the same manner as in Example 1. The results are shown in Table 2.

This Example is an example wherein the ratio of the compound (1) to the compound (3) was the same as in Examples 2 to 4, but no compound (2) was contained in the catalyst, and the corresponding magnesium acetate solution was separately added instead of the compound (2). The color coordinate b showed a high value.

Comparative Example 5

Ti+Si

Preparation of Other Solutions

A titanium tetrabutoxide solution was prepared by the following method. 100 ml of ethylene glycol was weighed in a 200 ml flask, and 0.7 g of titanium tetrabutoxide was dropped in the flask with stirring. After completion of the dropping, stirring was carried out at room temperature for 1 hour to obtain a colorless and transparent solution.

A tetraethoxysilane solution was prepared by the following method. 100 ml of ethylene glycol weighed in a 200 ml flask, and 2.2 g of tetraethoxysilane was dropped in this flask with stirring. After completion of the dropping, stirring was carried out at room temperature for 1 hour to obtain a partially suspended solution.

Melt Polycondensation

The polycondensation reaction and evaluation were carried out in the same manner as in Example 1 except that the ethylene glycol solution of titanium tetrabutoxide in an amount of 5 ppm as titanium atoms relative to the theoretical yield of a polyester to be obtained, and the ethylene glycol solution of tetraethoxysilane in an amount of 15 ppm as silicon atoms relative to the theoretical yield of a polyester to be obtained, were separately introduced into the reactor instead of the catalyst solution, and the polycondensation time was 132 minutes. The scheme of the compounds used is shown in Table 1, and the results are shown in Table 2.

Solid-Phase Polycondensation

The polycondensation reaction and evaluation were carried out in the same manner as in Example 1. The results are shown in Table 2.

This Example is an example wherein no compound (2) was used, and the compounds (1) and (3) were separately added. The addition amounts were the same as in Examples 2 to 4, but the volume resistivity and the acetaldehyde content showed high values.

Comparative Example 6

Ti+Mg

Preparation of Other Solutions

As the titanium tetrabutoxide solution, one prepared in Comparative Example 5 was used.

As the magnesium acetate solution, one prepared in Comparative Example 4 was used.

Melt Polycondensation

The polycondensation reaction and evaluation were carried out in the same manner as in Example 1 except that the ethylene glycol solution of titanium tetrabutoxide in an amount of 5 ppm as titanium atoms relative to the theoretical yield of a polyester to be obtained and the ethylene glycol solution of magnesium acetate tetrahydrate in an amount of 7.5 ppm as magnesium atoms relative to the theoretical yield of a polyester to be obtained (Ti/Mg=1/3: molar ratio) were separately introduced into the reactor instead of the catalyst solution, and the polycondensation reaction time was 150 minutes. The scheme of the compounds used is shown in Table 1, and the results are shown in Table 2.

Solid-Phase Polycondensation

The polycondensation reaction and evaluation were carried out in the same manner as in Example 1. The results are shown in Table 2.

This Example is an example wherein no compound (3) was used, and the compounds (1) and (2) were separately added. The addition amounts were the same as in Examples 3 and 4, but the color coordinate b and the acetaldehyde content showed high values.

Comparative Example 7

Ti/Si

Preparation of Catalyst 40 g of ethanol was put in a 500 ml beaker, and 6 g of tetraethoxysilane and 7.5 g of titanium isopropoxide (Ti/Si=1/1: molar ratio) were separately introduced with stirring at room temperature. Further, a mixed solution comprising 18 g of distilled water and 40 g of ethanol was dropped thereto. After stirring at 25° C. for 1 hour, formed precipitates were separated from the supernatant by centrifugal sedimentation at 5,000 revolutions for 5 minutes. The obtained precipitations were washed with distilled water once, and the precipitates were separated by centrifugal sedimentation at 5,000 revolutions for 5 minutes. The separated precipitates were vacuum dried using a rotary evaporator at 70° C. for 3 hours and then ground to a size of at most 100 μm. Further, 0.15 part of the ground solids were added to 100 parts of ethylene glycol, heated at 198° C. for 15 minutes and then cooled to 100° C. over a period of 60 minutes to obtain a catalyst solution.

The scheme of the preparation of the catalyst is shown in Table 1. The precipitates had no definite crystal structure.

Melt Polycondensation

The polycondensation reaction and evaluation were carried out in the same manner as in Example 1 except that the above-prepared catalyst was added in an amount of 10 ppm as titanium atoms relative to the theoretical yield of a polyester to be obtained, and the polymerization time was 197 minutes. The results are shown in Table 2.

Solid-Phase Polycondensation

The polycondensation reaction and evaluation were carried out in the same manner as in Example 1. The results are shown in Table 2.

This Example is an example wherein a known composite oxide obtained by mixing and hydrolyzing the compounds (1) and (3) was used as a catalyst. The obtained polyester contained foreign matters with a size of 10μ or larger in a large amount.

Comparative Example 8

Ti/Mg

Preparation of Catalyst 40 g of ethanol was put in a 500 ml beaker, and 5 g of magnesium diethoxide and 4 g of titanium tetraisopropoxide (Ti/Mg=1/3: molar ratio) were separately introduced with stirring at room temperature. Further, a mixed solution comprising 18 g of distilled water and 40 g of ethanol was dropped thereto. After stirring at 25° C. for 1 hour, formed precipitates were separated from the supernatant by centrifugal sedimentation at 5,000 revolutions for 5 minutes. The obtained precipitations were washed with distilled water once, and the precipitates were separated by centrifugal sedimentation at 5,000 revolutions for 5 minutes. The separated precipitates were vacuum dried using a rotary evaporator at 70° C. for 3 hours and then ground to a size of at most 100 µm. Further, 0.15 part of the ground solids were added to 100 parts of ethylene glycol, heated at 198° C. for 15 minutes and then cooled to 100° C. over a period of 60 minutes to obtain a catalyst solution.

The scheme of the preparation of the catalyst is shown in Table 1.

The precipitates had no definite crystal structure.

Melt Polycondensation

The polycondensation reaction and evaluation were carried out in the same manner as in Example 1 except that the above-prepared catalyst was added in an amount of 10 ppm as titanium atoms relative to the theoretical yield of a polyester to be obtained, and the polycondensation reaction time was 237 minutes. The results are shown in Table 2.

Solid-Phase Polycondensation

The polycondensation reaction and evaluation were carried out in the same manner as in Example 1. The results are shown in Table 2.

This Example is an example wherein a known composite oxide obtained by mixing and hydrolyzing the compounds (1) and (2) was used as a catalyst. The obtained polyester contained foreign matters with a size of 10µ or larger in a large amount.

The results of Comparative Examples 7 and 8 showed that foreign matters form in a large amount by use of a known composite oxide as a catalyst.

Comparative Example 9

Ti+Mg+Si

Preparation of Other Solutions

As the titanium tetrabutoxide solution, one prepared in Comparative Example 5 was used.

As the magnesium acetate solution, one prepared in Comparative Example 4 was used.

As the tetraethoxysilane solution, one prepared in Comparative Example 5 was used.

Melt Polycondensation

The polycondensation reaction and evaluation were carried out in the same manner as in Example 1 except that the ethylene glycol solution of titanium tetrabutoxide in an amount of 5 ppm as titanium atoms relative to the theoretical yield of a polyester to be obtained, the ethylene glycol solution of magnesium acetate tetrahydrate in an amount of 7.5 ppm as magnesium atoms relative to the theoretical yield of a polyester to be obtained and the ethylene glycol solution of tetraethoxysilane in an amount of 15 ppm as silicone atoms relative to the theoretical yield of a polyester to be obtained (Ti/Si/Mg=1/5/3: molar ratio) were separately introduced into the reactor instead of the catalyst solution, and the polymerization time was 150 minutes. The scheme of the compounds used is shown in Table 1, and the results are shown in Table 2.

Solid-Phase Polycondensation

The polycondensation reaction and evaluation were carried out in the same manner as in Example 1. The results are shown in Table 2.

This Example is an example wherein the compounds (1), (2) and (3) were separately added. The addition amounts were the same as in Examples 3 and 4, but the color coordinate value b and the acetaldehyde content of the obtained polyester showed high values.

Comparative Example 10

Ti/Mg/Si

Preparation of Catalyst

Into a dried reactor, the interior of which was replaced with nitrogen, 200 ml of deaerated and dehydrated n-heptane was introduced, and then 38 g of $MgCl_2$ and 273 g of tetra-n-butyl titanate were added, followed by reaction at 90° C. for 2 hours. After completion of the reaction, the temperature was decreased to 40° C., and then 48 g of methyl hydropolysiloxane (one of 20 centistokes) was introduced, followed by reaction at 40° C. for 3 hours. The formed solid component was washed with n-heptane, and the n-heptane was removed by decantation, followed by vacuum drying at room temperature.

The scheme of the preparation of the catalyst is shown in Table 1. The solid component had no definite crystal structure.

Melt Polycondensation

The polycondensation reaction and evaluation were carried out in the same manner as in Example 1 except that the above-prepared catalyst was used, and the polycondensation reaction time was 81 minutes. The results are shown in Table 2.

This Example is an example wherein a known solid obtained by mixing and reacting the compounds (1), (2) and (3), followed by drying for solidification without hydrolysis, was used as a catalyst. The obtained polyester contained foreign matters with a size of 10 u or larger in a large amount, and the color coordinated value b showed a high value.

Comparative Example 11

Ti/Mg

Preparation of Catalyst

Into a dried reactor, the interior of which was replace with nitrogen, 10 g of magnesium ethoxide was weighed in a nitrogen atmosphere, and then 60 ml of deaerated and dehydrated heptane was put. 18 g of tetra-n-butyl titanate was gradually put at room temperature with stirring. After stirring at 95° C. for 3 hours, heating was stopped and the reaction liquid was cooled to room temperature. The scheme of the preparation of the catalyst is shown in Table 1.

The solid component had no definite crystal structure.

Melt Polycondensation

The polycondensation reaction and evaluation were carried out in the same manner as in Example 1 except that the above-prepared catalyst was used, and the polycondensation reaction time was 101 minutes. The results are shown in Table 2.

This Example is an example wherein a known solid obtained by mixing and reacting the compounds (1) and (2), followed by drying for solidification without hydrolysis, was used as a catalyst.

The obtained polyester contained foreign matters with a size of 10 u or larger in a large amount, and the color coordinate value b showed a high value.

The results of Comparative Examples 10 and 11 showed that foreign matters form in a large amount in a polyester to be obtained by use of a known solid obtained by drying for solidification without hydrolysis as a catalyst.

EXAMPLE 8

Ti/Mg/Si/Ethylene Glycol System

The melt polycondensation was carried out in the same manner as in Example 2 except that a catalyst prepared in the same manner was added in an amount of 20 ppm as titanium atoms relative to the theoretical yield of a polyester to be obtained, and the polycondensation reaction time was 112 minutes. With respect to the obtained PET, the intrinsic viscosity and the amount of carboxyl end groups were measured, and XAFS measurement was carried out. The results are shown in Table 3.

EXAMPLE 9

Ti/Mg/Si/Ethylene Glycol System

The melt polycondensation was carried out in the same manner as in Example 5 except that a catalyst prepared in the same manner was added in an amount of 20 ppm as titanium atoms relative to the theoretical yield of a polyester to be obtained, and the polycondensation reaction time was 113 minutes. With respect to the obtained PET, the intrinsic viscosity and the amount of carboxyl end groups were measured, and XAFS measurement was carried out. The results are shown in Table 3.

Comparative Example 12

Ti/Si/Ethylene Glycol System

The melt polycondensation was carried out in the same manner as in Comparative Example 1 except that a catalyst prepared in the same manner was added in an amount of 20 ppm as titanium atoms relative to the theoretical yield of a polyester to be obtained, and the polycondensation reaction time was 109 minutes. With respect to the obtained PET, the intrinsic viscosity and the amount of carboxyl end groups were measured, and XAFS measurement was carried out. The results are shown in Table 3.

Comparative Example 13

Ti/Si/Ethylene Glycol System+Mg+P

The melt polycondensation was carried out in the same manner as in Comparative Example 4 except that a catalyst prepared in the same manner in an amount of 20 ppm as titanium atoms relative to the theoretical yield of a polyester to be obtained, magnesium acetate in an amount of 28 ppm as magnesium atoms relative to the theoretical yield of a polyester to be obtained and orthophosphoric acid in an amount of 12 ppm relative to the theoretical yield of a polyester to be obtained were added, and the polycondensation reaction time was 115 minutes. With respect to the obtained PET, XAFS measurement was carried out. The results are shown in Table 3.

The entire disclosure of Japanese Patent Application No. 2003-158369 filed on Jun. 3, 2003 and Japanese Patent Application No. 2003-158370 filed on Jun. 3, 2003 including specifications, claims, and summaries are incorporated herein by reference in their entireties.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Oxygen-containing organic solvent | | | | | | | | |
| Ethylene glycol | ml | 200 | 200 | 200 | 200 | 200 | 200 | 200 |
| Ethanol | g | | | | | | | |
| Compound used | | | | | | | | |
| Compound (1) | | TBT | TBT | TBT | TBT | TBT | TBT | TBT |
| Compound (2) | | Mg acetate | Mg acetate | Mg acetate | Mg acetate | Mg acetate | MEZn | Ca acetate |
| Compound (3) | | | TEOS | TEOS | TEOS | TEOS | TEOS | TEOS |
| Addition amount | | | | | | | | |
| Compound (1) | g | 0.7 | 0.7 | 0.7 | 0.7 | 0.7 | 0.7 | 0.7 |
| Compound (2) | g | 1.6 | 0.4 | 1.3 | 1.3 | 1.6 | 0.6 | 1.1 |
| Compound (3) | g | | 2.2 | 2.2 | 2.2 | 0.4 | 0.4 | 0.4 |
| Ratio of components | | | | | | | | |
| Ti/Si/metal component of (2) | | 1/0/4 | 1/5/1 | 1/5/3 | 1/5/3 | 1/1/4 | 1/1/2 | 1/1/2 |
| Order of addition | | Mg→Ti | Si→Mg→Ti | Si→Mg→Ti | Si→Ti→Mg | Mg→Si→Ti | Zn→Si→Ti | Ca→Si→Ti |
| Heating temperature after addition | °C. | 25 | 25 | 25 | 25 | 70 | 25 | 25 |
| Crystal structure | | Hexagonal | Hexagonal | Not measured | Not measured | Hexagonal | *1 | *1 |

TABLE 1-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Oxygen-containing organic solvent |  |  |  |  |  |  |  |
| Ethylene glycol | ml | 200 | 200 | 200 | 200 | 100 + 100 | 100 + 200 |
| Ethanol | g |  |  |  |  |  |  |
| Compound used |  |  |  |  |  |  |  |
| Compound (1) |  | TBT | TBT | TBT | TBT | TBT | TBT |
| Compound (2) |  |  |  |  |  |  | Mg acetate |
| Compound (3) |  | TEOS | TEOS | TEOS | TEOS | TEOS |  |
| Addition amount |  |  |  |  |  |  |  |
| Compound (1) | g | 0.7 | 0.7 | 0.7 | 0.7 | 0.7 | 0.7 |
| Compound (2) | g |  |  |  |  |  | 1.3 |
| Compound (3) | g | 2.2 | 0.4 | 0.4 | 2.2 | 2.2 |  |
| Ratio of components |  |  |  |  |  |  |  |
| Ti/Si/metal component of (2) |  | 1/5/0 | 1/1/0 | 1/1/0 | 1/5/0 | 1/5/0 | 1/0/3 |
| Order of addition |  | Si→Ti | Ti→Si | Si→Ti | Si→Ti Mg and P separately added | Separately added | Separately added |
| Heating temperature ° C. after addition |  | 25 | 25 | 25 | 25 |  |  |
| Crystal structure |  | Uniform solution | *1 | *1 | *1 |  |  |

|  |  | Comp. Ex. 7 | Comp. Ex. 8 | Comp. Ex. 9 | Comp. Ex. 10 | Comp. Ex. 11 |
|---|---|---|---|---|---|---|
| Oxygen-containing organic solvent |  |  |  |  | n-Heptane used | n-Heptane used |
| Ethylene glycol | ml |  |  | 100 + 100 + 200 | 200 |  |
| Ethanol | g | 40 | 40 |  |  |  |
| Compound used |  |  |  |  |  |  |
| Compound (1) |  | TIT | TIT | TBT | TBT | TBT |
| Compound (2) |  |  | Mg diethoxide | Mg acetate | MgCl$_2$ | Mg diethoxide |
| Compound (3) |  | TEOS |  | TEOS | MHPS |  |
| Addition amount |  |  |  |  |  |  |
| Compound (1) | g | 7.5 | 4 | 0.7 | 273 | 18 |
| Compound (2) | g |  | 5 | 1.3 | 38 | 10 |
| Compound (3) | g | 6 |  | 2.2 | 48 |  |
| Ratio of components |  |  |  |  |  |  |
| Ti/Si/metal component of (2) |  | 1/1/0 | 1/0/3 | 1/5/3 | Unknown | 1/0/1.7 |
| Order of addition |  | Dried for solidification and added | Dried for solidification and added | Separately added | Dried for solidification and added | Mg→Ti |
| Heating temperature ° C. after addition |  |  |  |  | Room temperature to 90 | 95 |
| Crystal structure |  | *2 | *2 |  | *2 | *2 |

TBT: Titanium tetrabutoxide
TIT: Titanium tetraisopropoxide
Mg Acetate: Magnesium acetate tetrahydrate
MgCl$_2$: Magnesium chloride
TBGe: Germanium tetrabutoxide
TBSb: Antimony tributoxide
MEZn: Zinc methoxyethoxide
Mg diethoxide: Magnesium diethoxide
Ca acetate: Calcium acetate monohydrate
MHPS: Methyl hydropolysiloxane
TEOS: Tetraethoxysilane
*1: No crystals collected from uniform solution.
*2: Solid could be collected but had no definite crystal structure.

TABLE 2

|  |  | Ex. 1 | Ex. 2 | Ex. 3 | Ex. 4 | Ex. 5 | Ex. 6 | Ex. 7 |
|---|---|---|---|---|---|---|---|---|
| Ti addition amount | ppm | 5 | 5 | 5 | 5 | 6 | 5 | 5 |
| Polymerization time | min. | 141 | 135 | 131 | 136 | 157 | 134 | 136 |
| Polymer physical properties after melt polymerization | | | | | | | | |
| Intrinsic viscosity | dl/g | 0.573 | 0.562 | 0.561 | 0.565 | 0.634 | 0.587 | 0.562 |
| AV | eq/t | 20 | 19 | 20 | 20 | 18 | 14 | 12 |
| Co-b | | 3 | 2.2 | 2.9 | 2.6 | 4.2 | 3.8 | 3.7 |
| $\rho V(\times 10^7)$ | $\Omega \cdot cm$ | 2.4 | 14 | 9.8 | 10 | 4.3 | 24 | 13 |
| Amount of foreign matters of 10 μm or larger | Number/g | 0 | 0 | 1 | 1 | 0 | 0 | 1 |
| Polymer physical properties after solid phase polymerization | | | | | | | | |
| Intrinsic viscosity | dl/g | 0.656 | 0.676 | 0.657 | 0.734 | 0.802 | 0.758 | 0.734 |
| AA | ppm | 27 | 19 | 20 | 20 | 20 | 21 | 21 |

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|
| Ti addition amount | ppm | 5 | 5 | 5 | 5 | 5 | 5 | 10 | 10 | 5 | 5 | 5 |
| Polymerization time | min. | 111 | 117 | 112 | 125 | 132 | 150 | 197 | 237 | 150 | 81 | 101 |
| Polymer physical properties after melt polymerization | | | | | | | | | | | | |
| Intrinsic viscosity | dl/g | 0.573 | 0.59 | 0.551 | 0.558 | 0.55 | 0.56 | 0.549 | 0.552 | 0.562 | 0.532 | 0.592 |
| AV | eq/t | 17 | 16 | 20 | 20 | 21 | 23 | 22 | 23 | 21 | 24 | 21 |
| Co-b | | 3.8 | 3.5 | 3.5 | 5 | 5 | 5 | 4.9 | 5.2 | 5.3 | 5.7 | 5.3 |
| $\rho V(\times 10^7)$ | $\Omega \cdot cm$ | 130 | 130 | 150 | 14 | 140 | 11 | 140 | 32 | 12 | 19 | 13 |
| Amount of foreign matter of 10 μm or larger | Number/g | 0 | 0 | 0 | 0 | 1 | 2 | 24 | 26 | 1 | 32 | 28 |
| Polymer physical properties after solid phase polymerization | | | | | | | | | | | | |
| Intrinsic viscosity | dl/g | 0.73 | 0.762 | 0.712 | 0.723 | 0.671 | 0.637 | 0.609 | 0.604 | 0.71 | Not measured | Not measured |
| AA | ppm | 17 | 18 | 18 | 20 | 24 | 26 | 23 | 25 | 25 | Not measured | Not measured |

TABLE 3

|  |  | Ex. 8 | Ex. 9 | Comp. Ex. 12 | Comp. Ex. 13 |
|---|---|---|---|---|---|
| Ti addition amount | ppm | 20 | 20 | 20 | 20 |
| Polymerization time | min. | 112 | 113 | 109 | 115 |
| Polymer physical properties after melt polymerization | | | | | |
| Carboxyl end groups | eq/ton | 20 | 19 | 34 | 24 |
| Intrinsic viscosity | dl/g | 0.657 | 0.643 | 0.631 | 0.629 |
| R = A/B | | 0.2644 | 0.3111 | 0.0928 | 0.1065 |

What is claimed is:

1. A catalyst for the production of a polyester, comprising:
   (A) at least one Group 4B element compound;
   (B) a compound of at least one element selected from the group consisting of magnesium, calcium and zinc;
   (C) a silicate compound; and
   (D) an oxygen-containing organic solvent;
   wherein said oxygen-containing organic solvent is a monohydric alcohol or a dihydric alcohol.

2. The catalyst according to claim 1, wherein compound (A) is a titanium compound.

3. The catalyst according to claim 2, wherein the titanium compound is a titanium alkoxide.

4. The catalyst according to claim 1, wherein compound (B) is a magnesium compound.

5. The catalyst according to claim 1, wherein the catalyst is in the form of hexagonal crystal that are comprised of a Group 4B element derived from said compound (A), magnesium derived from compound (B), and silicon derived from compound (C), the elements being solvated by six molecules of ethylene glycol.

6. The catalyst for according to claim 1, wherein compound (C) is an orthosilicate compound.

7. The catalyst according to claim 6, wherein orthosilicate compound (C) is tetramethoxysilane, tetraehtoxysilane, tetrabutoxysilane, tetraisopropoxysilane, tetrabutoxysilane, tetraphenoxysilane, tetrabenzyloxysilane, diphenyldiethoxysilane or diphenyldiethoxysilane.

8. The catalyst according to claim 1, wherein amounts of said compounds (A) and (B) are combined such as to give a mole ratio of Group 4B atoms to atoms of at least one element selected from the group consisting of magnesium, calcium and zinc ranging from 95:5 to 5:95.

9. The catalyst according to claim 8, wherein said mole ratio ranges from 95:5 to 10:90.

10. The catalyst according to claim 1, wherein amounts of said compounds (C) and (A) are combined such as to give a mole ratio of silicon atoms to Group 4B atoms ranging from 95:5 to 5:95.

11. The catalyst according to claim 10, wherein said mole ration ranges from 90:10 to 5:95.

12. The catalyst prepared by a process comprising: mixing
   (A) at least one Group 4B element compound,
   (B) a compound of at least one element selected from the group consisting of magnesium, calcium and zinc,
   (C) a silicate compound sequentially in any order in
   (D) an oxygen-containing organic solvent; and obtaining the product catalyst as a solvate;
   wherein said oxygen-containing organic solvent is a monohydric alcohol or a dihydric alcohol.

13. The catalyst prepared by the process according to claim 12, wherein the preparation of said mixture is conducted at a temperature of at most 150° C.

14. A process for producing a polyester, which comprises:
   polycondensing a dicarboxylic acid component comprising an aromatic dicarboxylic acid and/or its ester forming derivative as the main constituent of the component and a dihydric alcohol component in an esterification reaction and/or an ester exchange reaction in the presence of the catalyst as defined in claim 1.

15. The process for producing a polyester according to claim 14, wherein the esterification reaction is conducted at a temperature of 240° to 280°C.

16. The process for producing a polyester according to claim 14, wherein the aromatic dicarboxylic acid is terephthalic acid, phthalic acid, isophthalic acid, dibromoisophthalic acid, sodium sulfoisophthalate, phenylenedioxy dicarboxylic acid, 4,4'-diphenyl dicarboxylic acid, 4,4'-diphenyl ether dicarboxylic acid, 4,4'-diphenyl keton dicarboxylic acid, 4,4'-diphenoxyethane dicarboxylic acid, 4,4'-diphenylsulfone dicarboxylic acid or 2,6,-naphthalene dicarboxylic acid.

17. The process for producing a polyester according to claim 14, wherein the dihydric alcohol is ethylene glycol, trimethylene glycol, tetramethylene glycol, pentamethylene glycol, hexamethylene glycol, octamethylene glycol, decamethylene glycol, neopentyl glycol, 2-ethyl-2-butyl-1,3-propanediol, diethylene glycol, polyethylene glycol, polytetramethylene ether glycol, 1,2-cyclohexanediol, 1,4-cyclohexanediol 1,1-cyclohexanedimethylol, 1,4-cyclohexanedimethylol or 2,5-norbornanedimethylol, xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone or bis(4-β-hydroxyethoxyphenyl)sulfonic acid.

18. A titanium-containing polyethylene terephthalate having the following characteristics:
   (A) a titanium K absorption edge having a the peak intensity ratio R defined by R=A/B exceeds 0.2, wherein A is the intensity of a peak having the maximum intensity among K absorption pre-edge peaks, and B is the maximum peak intensity of K absorption post-edge peaks in a XANES spectrum obtained by normalizing a XAFS spectrum;
   (B) an amount of carboxyl end groups of less than 35 eq/ton; and
   (C) an intrinsic viscosity of at least 0.5 dl/g.

19. A titanium-containing polyethylene terephthalate produced by the process of claim 14, having the following characteristics:
   (A) a titanium K absorption edge having a peak intensity ratio R defined by R=A/B exceeds 0.2, wherein A is the intensity of a peak having the maximum intensity among K absorption pre-edge peaks, and B is the maximum peak intensity of K absorption post-edge peaks in a XANES spectrum obtained by normalizing a XAFS spectrum;
   (B) an amount of carboxyl end groups of less than 35 eq/ton; and
   (C) an intrinsic viscosity of at least 0.5 dl/g.

* * * * *